US012796887B2

(12) United States Patent
Goshgarian et al.

(10) Patent No.: US 12,796,887 B2
(45) Date of Patent: Nov. 17, 2026

(54) BIASING LATCH MECHANISM FOR AN APPLIANCE DOOR

(71) Applicant: WHIRLPOOL CORPORATION, Benton Harbor, MI (US)

(72) Inventors: David P. Goshgarian, St. Joseph, MI (US); Ashish Annasaheb Sarwade, Dharashiv (IN); Ranit Thapliyal, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 24 days.

(21) Appl. No.: 19/045,891

(22) Filed: Feb. 5, 2025

(65) Prior Publication Data

US 2026/0224089 A1 Aug. 6, 2026

(51) Int. Cl.
*A47L 15/42* (2006.01)
*E05C 1/12* (2006.01)

(52) U.S. Cl.
CPC ............ *A47L 15/4259* (2013.01); *E05C 1/12* (2013.01); *A47L 2501/22* (2013.01)

(58) Field of Classification Search
None
See application file for complete search history.

(56) References Cited

U.S. PATENT DOCUMENTS

| | | | |
|---|---|---|---|
| 3,985,023 A | 10/1976 | Guth | |
| 8,671,587 B2 | 3/2014 | Berends et al. | |
| 8,905,494 B2 | 12/2014 | Kilic | |
| 8,944,535 B2 | 2/2015 | Becchio et al. | |
| 9,084,526 B2 | 7/2015 | Assmann et al. | |
| 9,885,141 B2 | 2/2018 | Becchio et al. | |
| 11,889,965 B2 | 2/2024 | Dirnberger et al. | |
| 2006/0145485 A1* | 7/2006 | Hapke ................ | A47L 15/4259 292/251.5 |
| 2024/0298869 A1 | 9/2024 | Friedke et al. | |

FOREIGN PATENT DOCUMENTS

| | | |
|---|---|---|
| EP | 2822442 A2 | 1/2015 |
| FR | 2997283 A1 | 5/2014 |

* cited by examiner

*Primary Examiner* — Levon J Shahinian
(74) *Attorney, Agent, or Firm* — Price Heneveld LLP

(57) ABSTRACT

A washing appliance includes a cabinet, a door, an electrical actuator, and a strike plate. The cabinet partially defines a processing space therein. The door is operable relative to the cabinet between a closed position, an open position, and an ajar position. The door in the closed position is biased to the ajar position. The electrical actuator operates a latch mechanism between a rest position and a release position. The electrical actuator and the latch mechanism are disposed within the door. The strike plate is attached to the cabinet. The latch mechanism in the rest position engages the strike plate to define the closed position. Operation of the latch mechanism to the release position disengages the latch mechanism from the strike plate and allows the door to move into the ajar position to define the vent.

20 Claims, 12 Drawing Sheets

BIASING LATCH MECHANISM FOR AN APPLIANCE DOOR

BACKGROUND OF THE DISCLOSURE

The present disclosure generally relates to dishwashing appliances and, more specifically, a biasing latch mechanism for a dishwashing appliance that is mounted within an operable door panel of the dishwasher, where the biasing latch mechanism includes an electrical actuator that operates to disengage the door panel from a strike plate that is attached to a cabinet of the appliance.

SUMMARY OF THE DISCLOSURE

According to one aspect of the present disclosure, a washing appliance includes a cabinet, a door, an electrical actuator, and a strike plate. The cabinet partially defines a processing space therein. The door is operable relative to the cabinet between a closed position that encloses the processing space, an open position that provides access to the processing space, and an ajar position that defines a vent of the processing space between the cabinet and the door. The door in the closed position is biased to the ajar position. The electrical actuator selectively operates a latch mechanism between a rest position and a release position. The electrical actuator and the latch mechanism are disposed within the door. The strike plate is attached to the cabinet. The latch mechanism in the rest position selectively engages the strike plate to define the closed position. Further, operation of the latch mechanism to the release position selectively disengages the latch mechanism from the strike plate and allows the door to move into the ajar position to define the vent.

According to another aspect of the present disclosure, a door assembly of a cleaning appliance includes a front panel, a rear panel, an electrical actuator, and a latch mechanism. The front panel is configured to be rotationally operable relative to an appliance cabinet, and the front panel is further configured to define an outer surface of the appliance cabinet. The front panel defines a handle recess. The rear panel is configured to partially define a processing space of the appliance cabinet. The front panel is attached to the rear panel to define an interior door cavity therein. The handle recess extends into the interior door cavity toward the rear panel. The electrical actuator is disposed within the interior door cavity proximate the handle recess. The electrical actuator operates between a retracted position and an extended position. The latch mechanism is in communication with the electrical actuator. The latch mechanism operates between a rest position that corresponds with the retracted position of the electrical actuator and a release position that corresponds with the extended position of the electrical actuator. In the rest position, the latch mechanism is adapted to selectively secure the front panel and the rear panel to a strike plate of the appliance cabinet. In the release position, the latch mechanism is adapted to disengage from the strike plate.

According to yet another aspect of the present disclosure, a washing appliance includes a cabinet, a door, an electrical actuator, a latch mechanism, and a strike plate. The cabinet partially defines a processing space therein. The door is operable relative to the cabinet between a closed position that encloses the processing space, an open position that provides access to the processing space, and an ajar position that defines a vent of the processing space between the cabinet and the door. The door in the closed position is biased to the ajar position. The electrical actuator has a shaft that operates along an operational axis and a biasing portion that is attached to the shaft. The biasing portion moves along a biasing axis that is laterally offset from the operational axis. A latch mechanism is in operational communication with the biasing portion. The electrical actuator selectively operates the latch mechanism between a rest position and a release position. The electrical actuator and the latch mechanism are disposed within an interior door cavity of the door. The strike plate is attached to the cabinet. The latch mechanism in the rest position selectively engages the strike plate to define the closed position. Further, operation of the latch mechanism to the release position selectively disengages the latch mechanism from the strike plate and allows the door to move into the ajar position to define the vent.

These and other features, advantages, and objects of the present disclosure will be further understood and appreciated by those skilled in the art by reference to the following specification, claims, and appended drawings.

Figure 1:
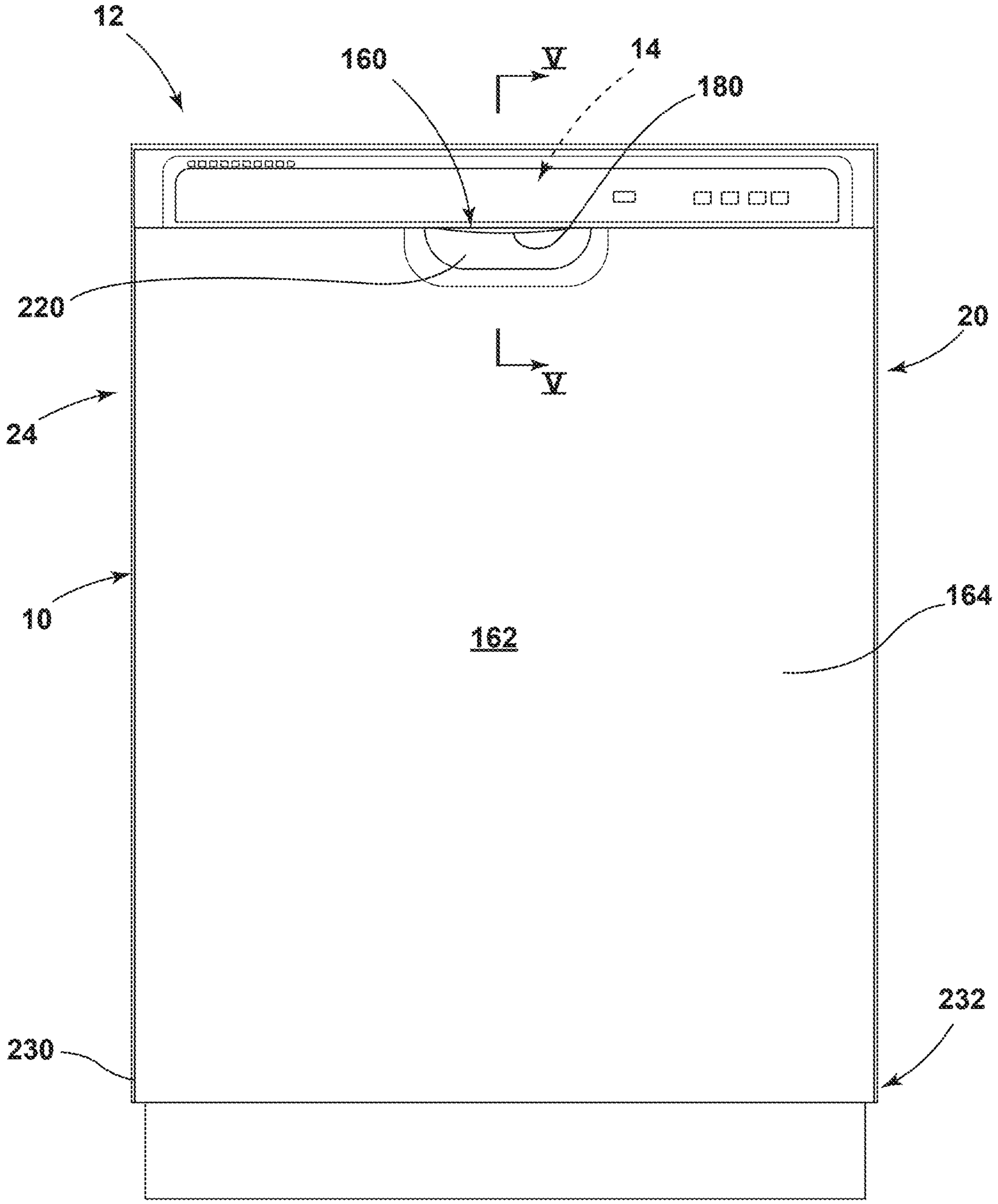
FIG. 1 is a front elevation view of a dishwashing appliance incorporating an aspect of the biasing latch mechanism.
Figure 2:
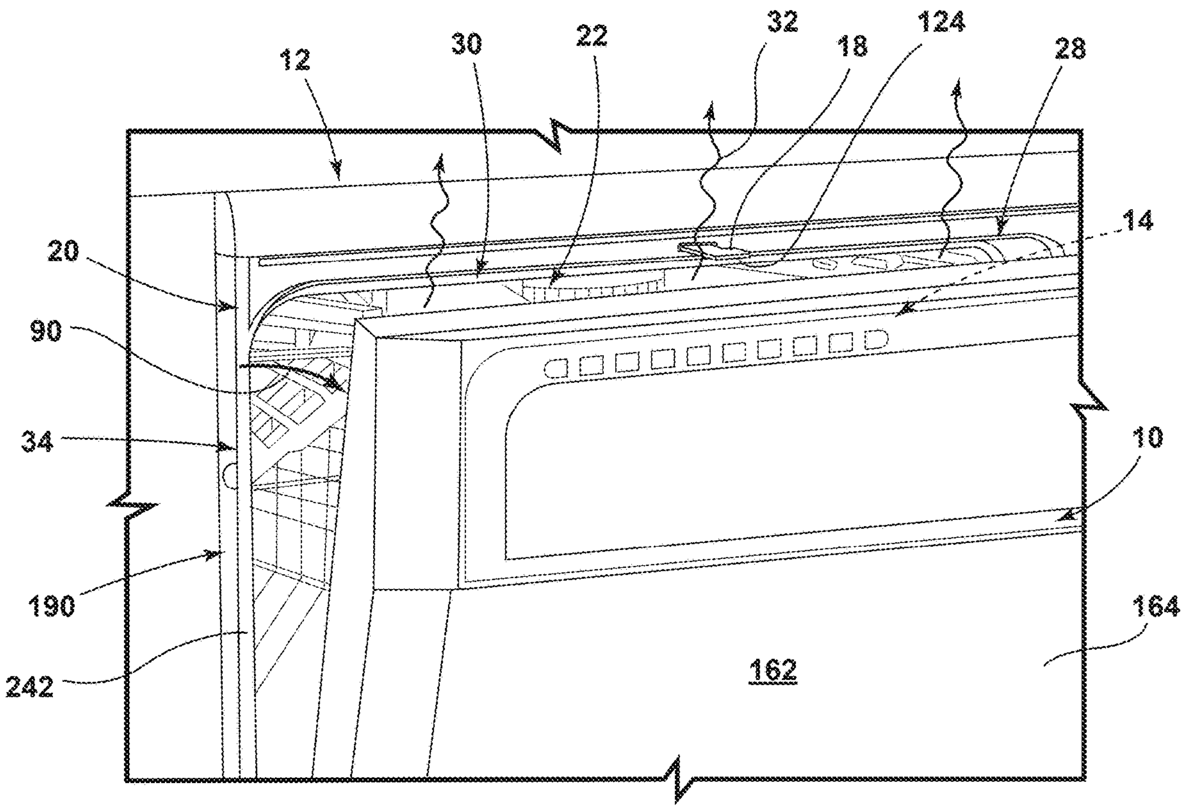
FIG. 2 is an enlarged perspective view of the dishwashing appliance incorporating an aspect of the biasing latch mechanism with the biasing latch mechanism in a release position and the door in an ajar position.
Figure 3:
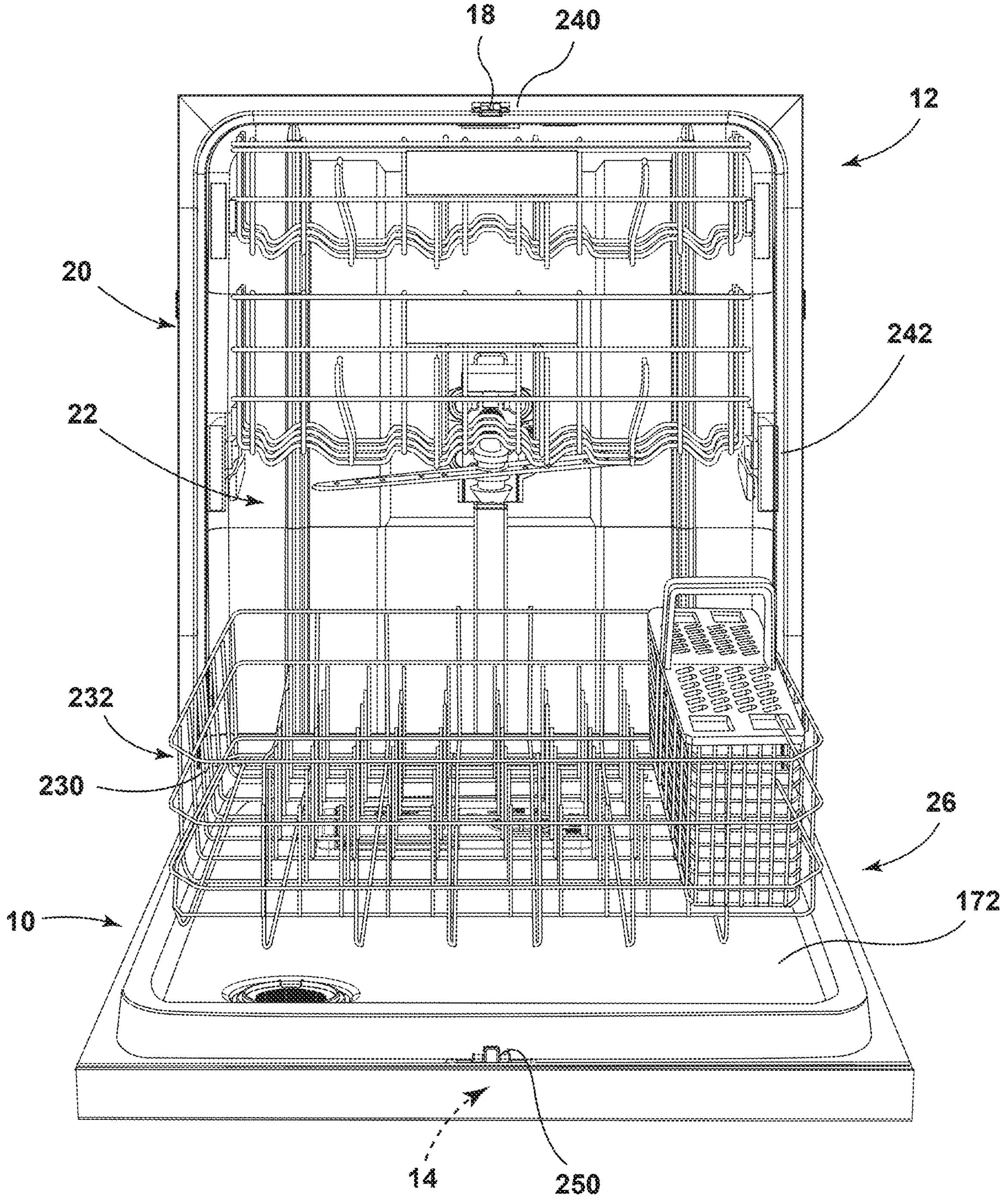
FIG. 3 is a front perspective view of the dishwashing appliance of FIG. 1 and showing the door in an open position.
Figure 4:
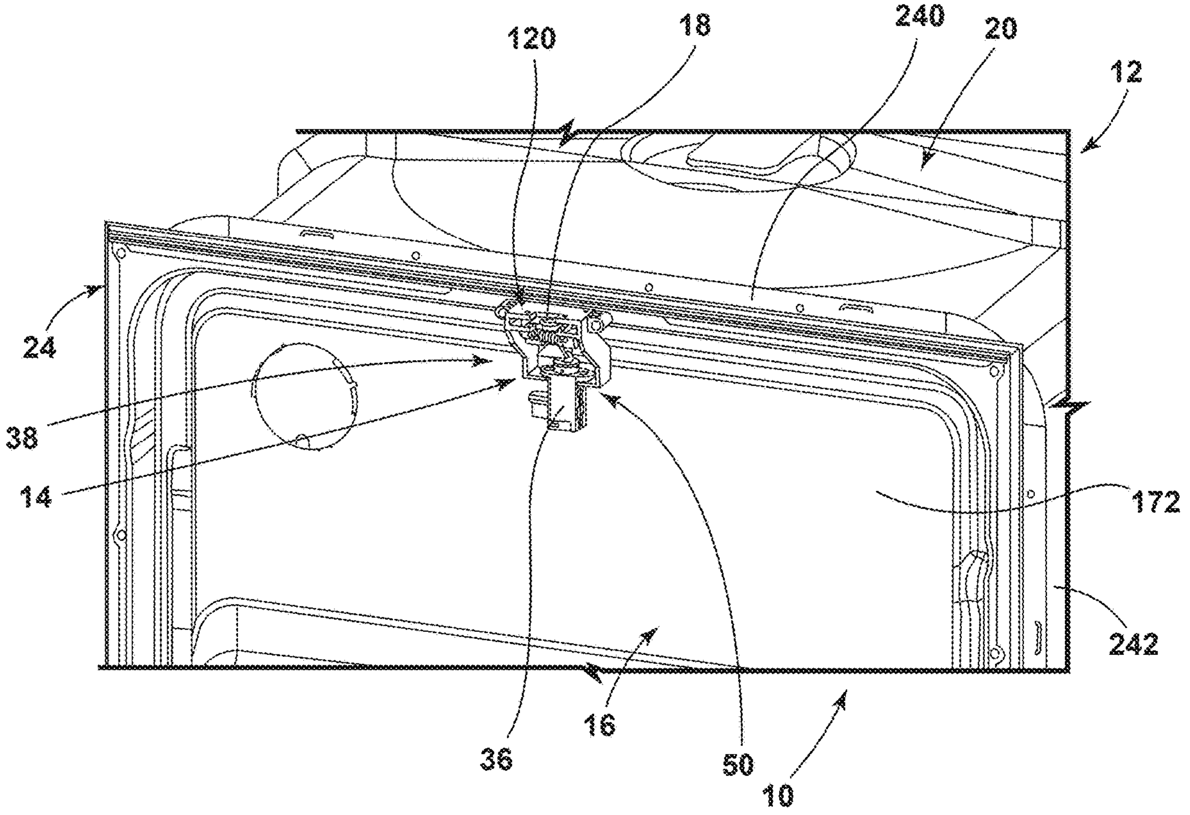
FIG. 4 is a front perspective view of a dishwashing appliance with a front panel removed and showing placement of the biasing latch mechanism within the interior door cavity of the door.
Figure 5:
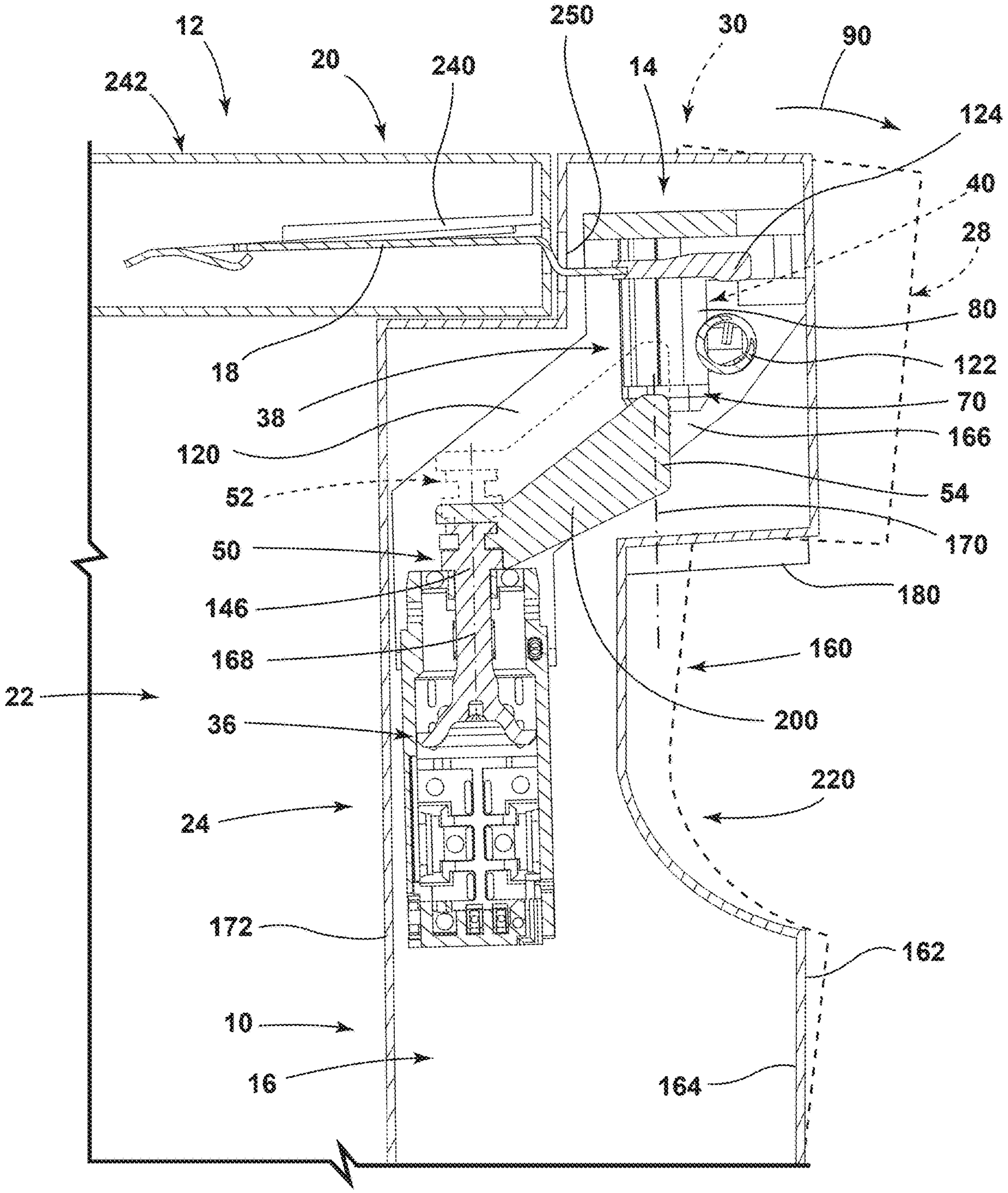
FIG. 5 is a cross-sectional view of the appliance of FIG. 1 taken along line V-V and showing placement of the biasing latch mechanism within the door.
Figure 6:
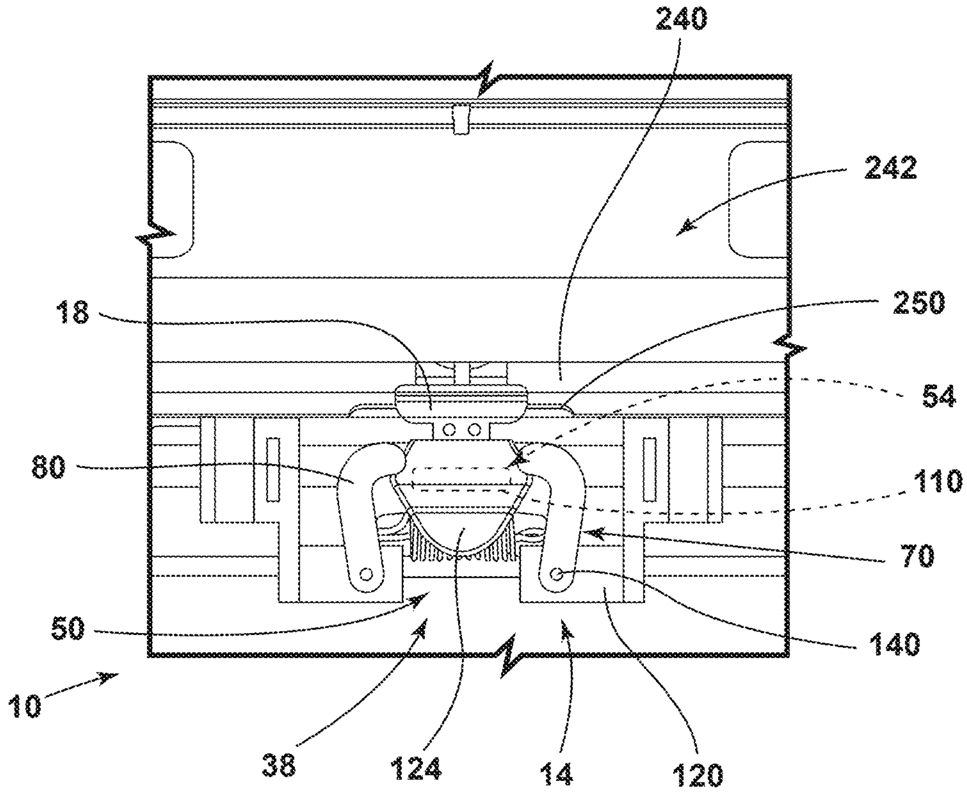
FIG. 6 is a top plan view of the biasing latch mechanism shown in the rest position and the door in a closed position.
Figure 7:
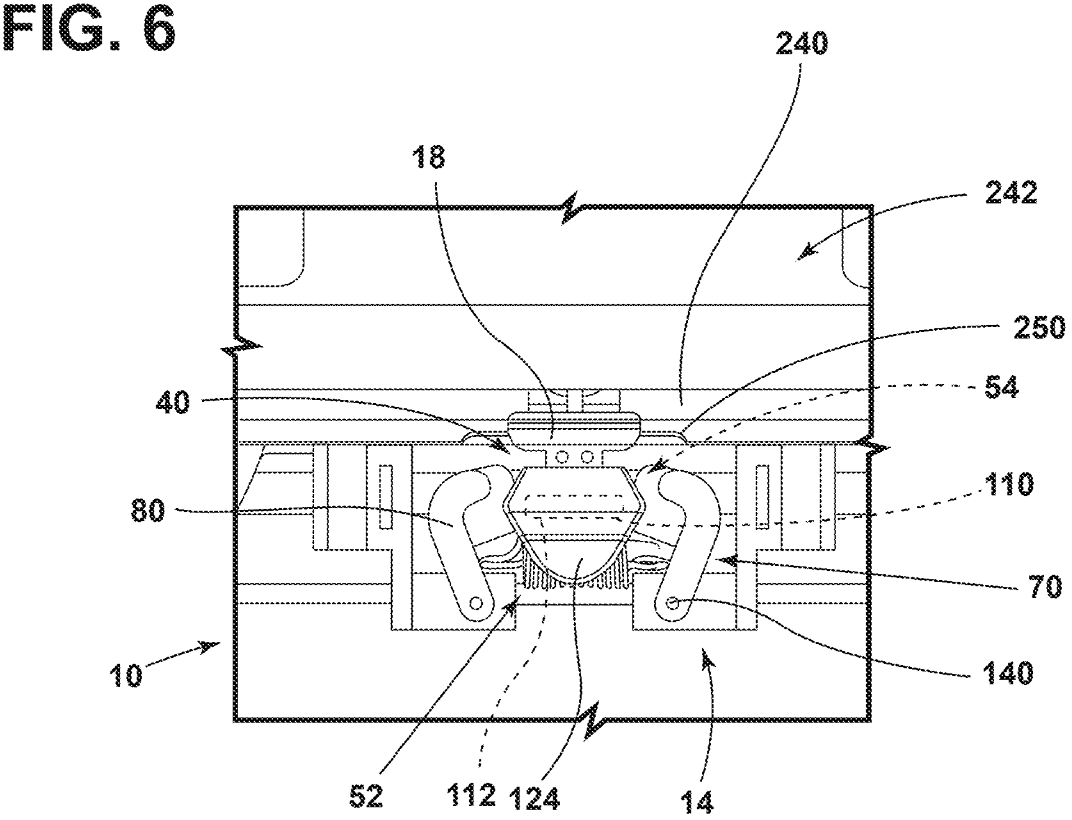
FIG. 7 is a top plan view of the biasing latch mechanism of FIG. 6 and showing the biasing latch mechanism in the release position and the door moved to the ajar position.
Figure 8:
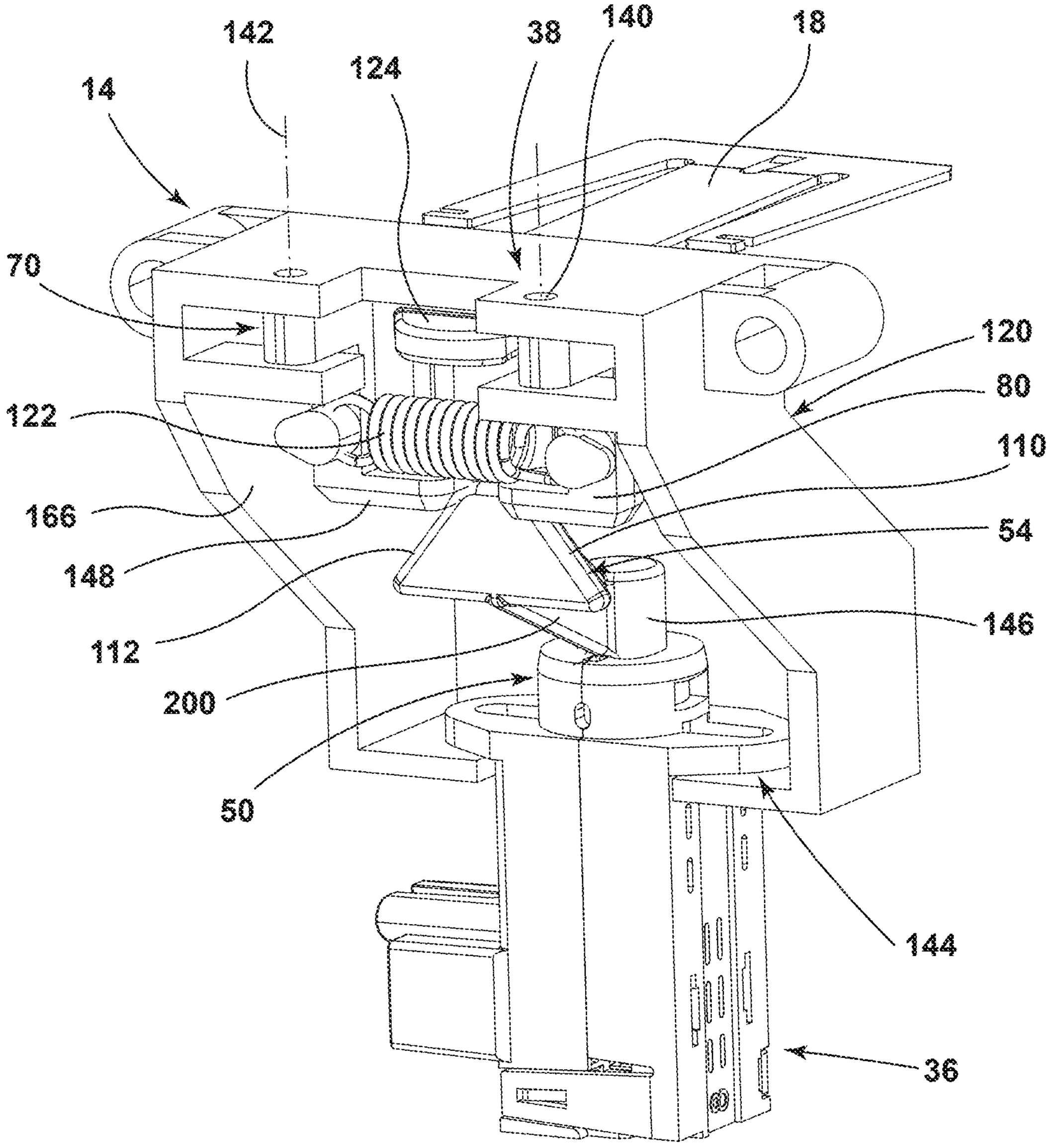
FIG. 8 is a side perspective view of an aspect of the biasing latch mechanism shown in the rest position.
Figure 9:
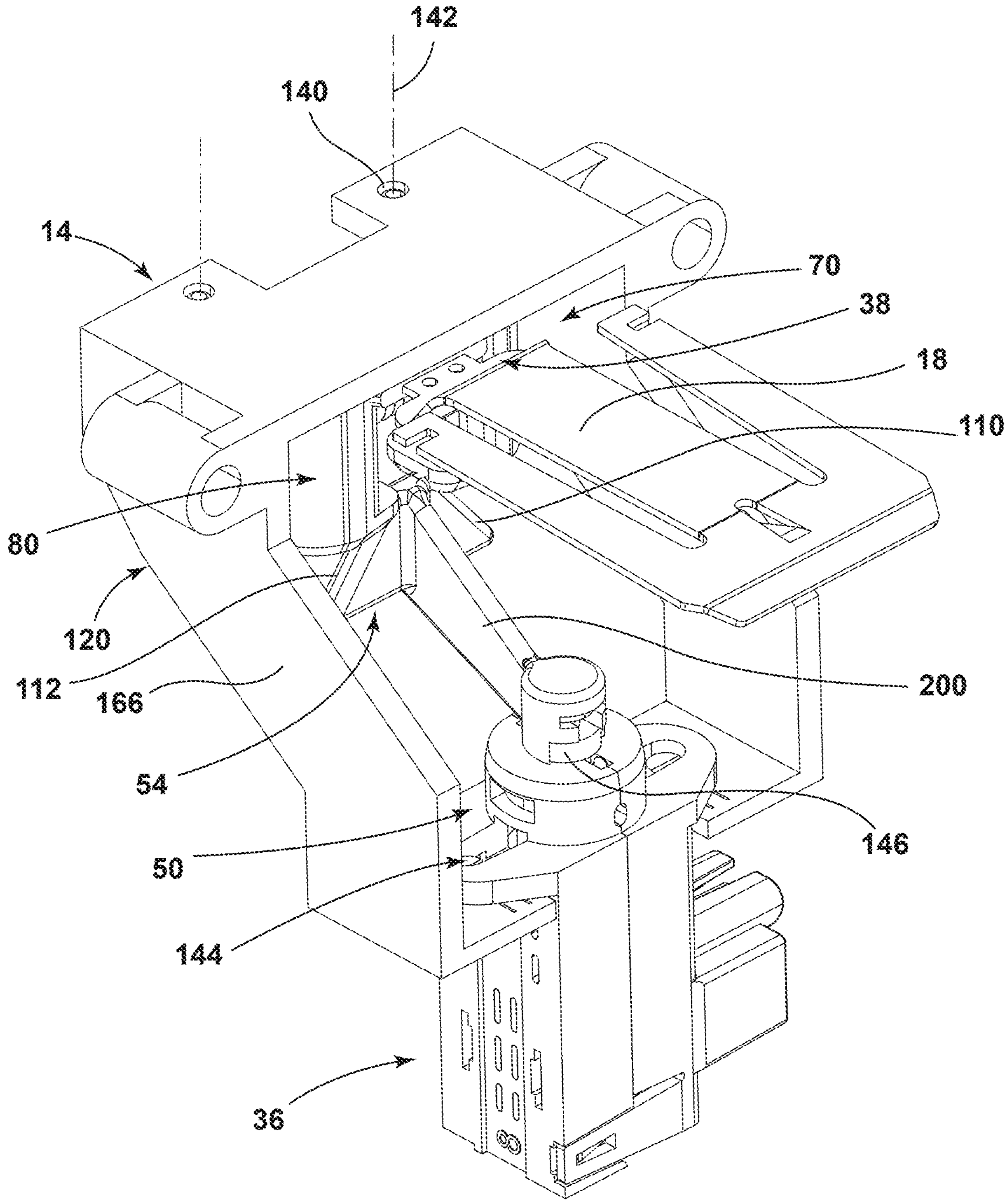
FIG. 9 is a top perspective view of the biasing latch mechanism of FIG. 8.
Figure 10:
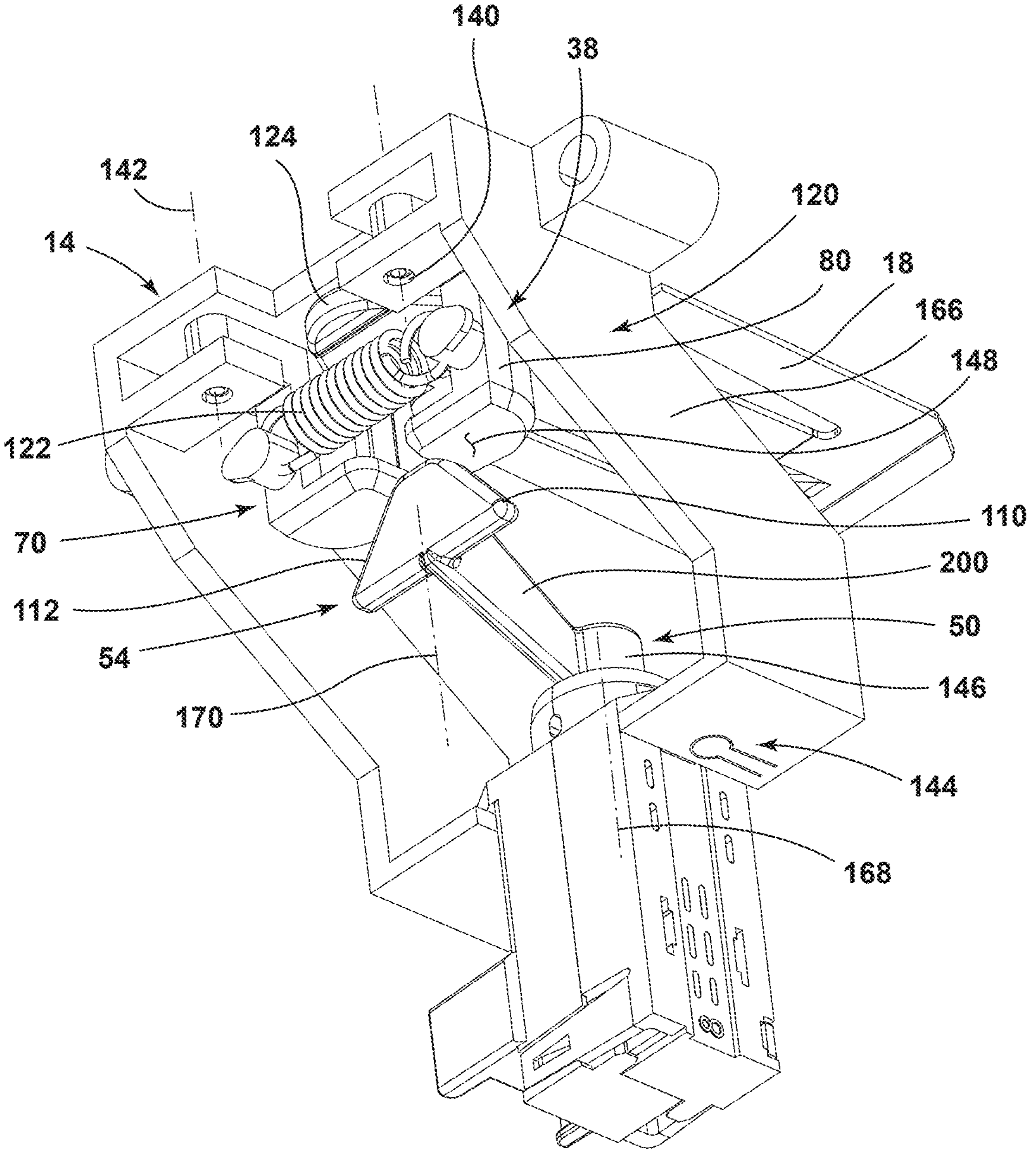
FIG. 10 is a bottom perspective view of the biasing latch mechanism of FIG. 8.
Figure 11:
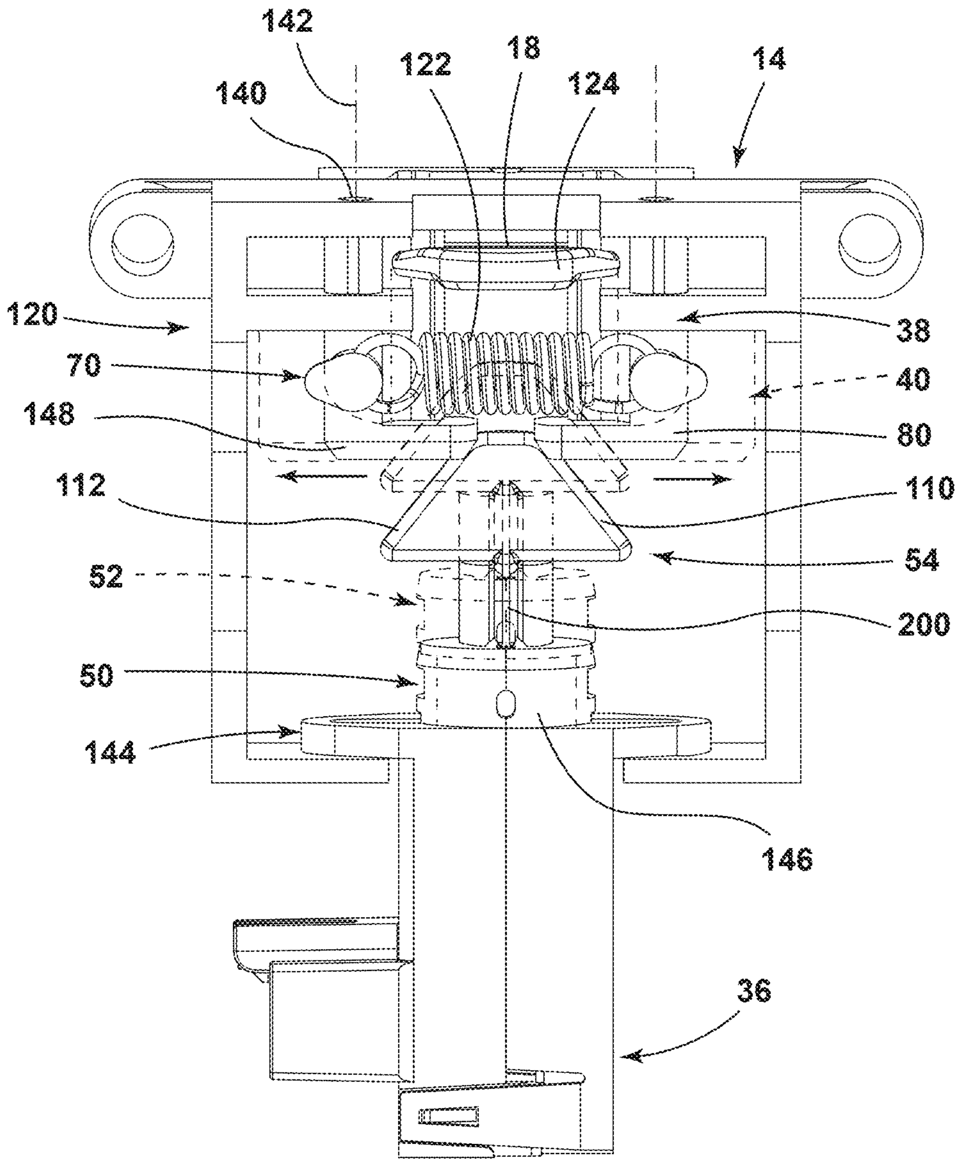
FIG. 11 is a rear elevation view of the biasing latch mechanism of FIG. 8 and showing the biasing latch mechanism in the release position.
Figure 12:
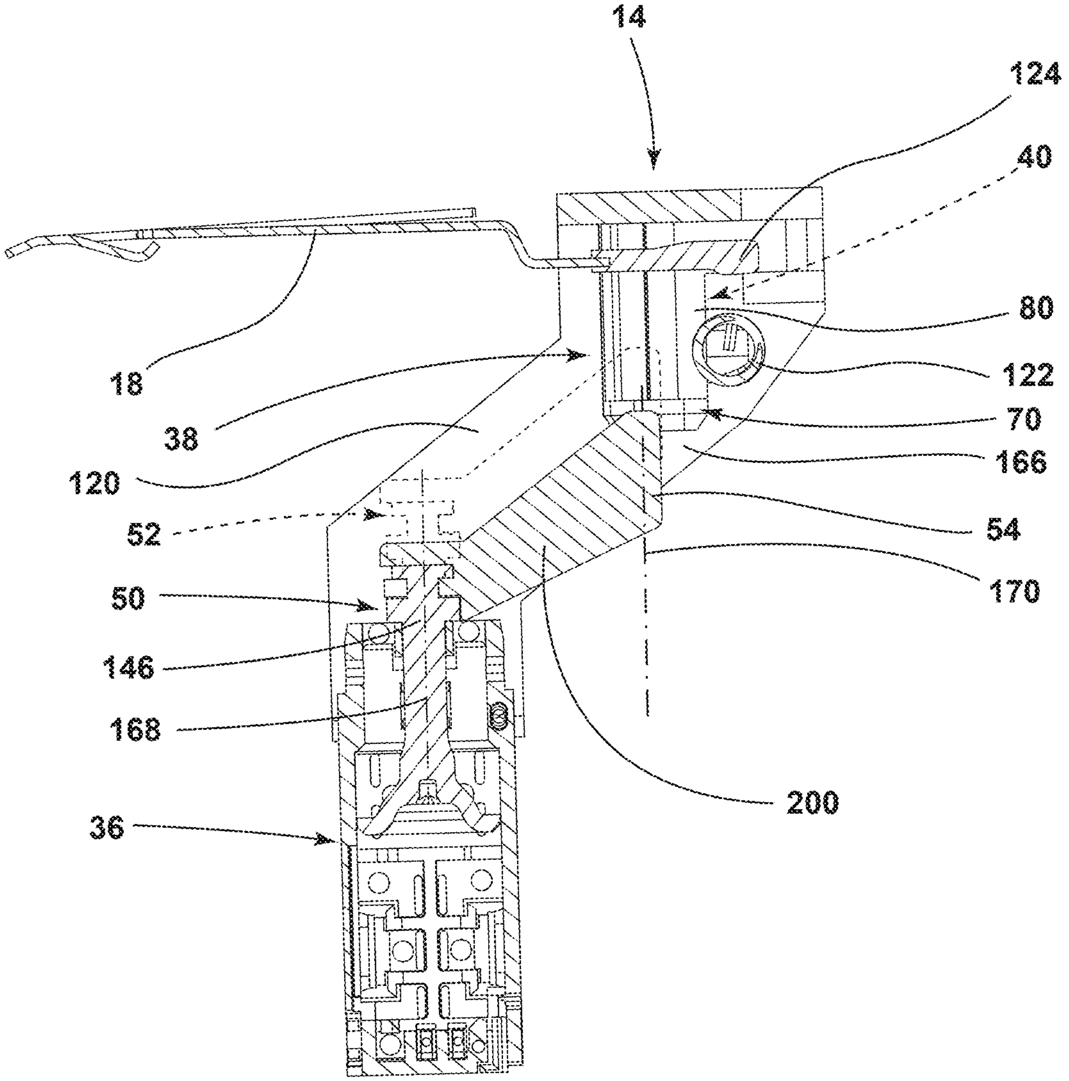
FIG. 12 is a schematic cross-sectional view of the biasing latch mechanism of FIG. 8 and showing operation of the biasing latch mechanism between the rest position and the release position.
Figure 13:
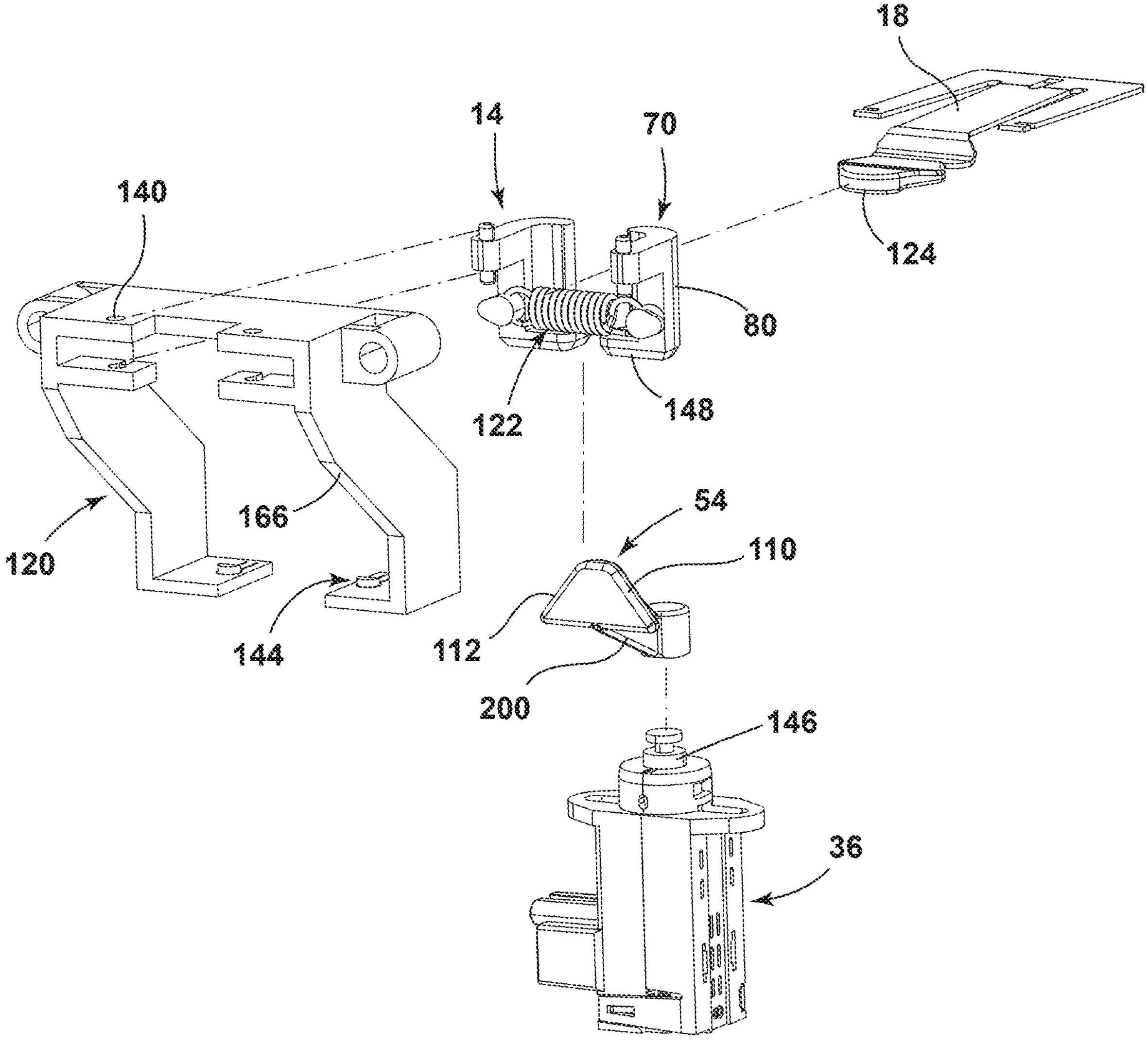
FIG. 13 is an exploded perspective view of the biasing latch mechanism of FIG. 8.

Components in the figures are not necessarily to scale, emphasis instead being placed upon illustrating the principles described herein.

The components in the figures are not necessarily to scale, emphasis instead being placed upon illustrating the principles described herein.

DETAILED DESCRIPTION

The present illustrated embodiments reside primarily in combinations of method steps and apparatus components related to a biasing plunger latch for an appliance door. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a." does not, without more constraints, preclude the existence of additional identical elements in the process, method, article, or apparatus that comprises the element.

Referring to FIGS. 1-13, reference numeral 10 general refers to a door 10, typically in the form of a door assembly 10, for a cleaning appliance 12, with the door 10 including a latch mechanism 14 that operates within an interior door cavity 16 of the door 10 and engages a strike plate 18 that is attached to a structural cabinet 20 of the appliance 12. According to the various aspects of the device, the cleaning appliance 12, typically in the form of a dishwashing appliance 12, includes the cabinet 20 that partially defines a processing space 22 therein. The door 10, or door assembly 10, is operable relative to the cabinet 20 between a closed position 24 that encloses the processing space 22, an open position 26 that provides access to the processing, space 22, and an ajar position 28 that defines a vent 30 of the processing space 22. The vent 30 is disposed between the cabinet 20 and the door 10 moved to the ajar position 28 to allow heated air, typically in the form of steam 32, to escape the processing space 22 during a drying phase 34 of the appliance 12, as described herein. Typically, the door 10 in the closed position 24 is biased toward the ajar position 28. An electrical actuator 36 is disposed within the door 10 and selectively operates the latch mechanism 14 between a rest position 38 and a release position 40. The electrical actuator 36 and the latch mechanism 14 are disposed within the interior door cavity 16 of the door 10. The strike plate 18 is attached to the cabinet 20. The latch mechanism 14 in the rest position 38 selectively engages the strike plate 18 to define the closed position 24 of the door 10. Operation of latch mechanism 14 to the release position 40 selectively disengages the latch mechanism 14 from the strike plate 18. By disengaging the latch mechanism 14 from the strike plate 18, the biasing force exerted on the door 10 moves the door 10 from the closed position 24 to the ajar position 28 to define the vent 30.

According to the various aspects of the device, the electrical actuator 36 and the latch mechanism 14 are disposed within the interior door cavity 16 of the door 10. Accordingly, electrical power is run into the door 10, typically via the cabinet 20, for delivering electrical power to the electrical actuator 36. In this manner, where the electrical actuator 36 or the latch mechanism 14 fail, become damaged, or are in need of repair or replacement, the door 10 for the appliance 12 can be removed for maintenance, repair, or replacement. At the same time, disassembly of the cabinet 20 is not typically needed for servicing of the latch mechanism 14 or the electrical actuator 36.

According to the various aspects of the device, the electrical actuator 36 is a wax motor that operates the latch mechanism 14 between the rest position 38 and the release position 40. In this manner, the wax motor operates between a retracted position 50 that corresponds to the rest position 38 and an extended position 52 that corresponds to the release position 40 of the latch mechanism 14. During this operation of the electrical actuator 36, a biasing portion 54 is operated by the electrical actuator 36 between the retracted position 50 and the extended position 52 to engage at least one catch 70 of the latch mechanism 14. Typically, the biasing portion 54 can take the form of a wedge, angular surface, or other similar biasing structure that can be used to operate the latch mechanism 14, as described herein.

According to various aspects of the device, the electrical actuator 36 can take the form of a wax motor, or other similar electrical actuator. Such electrical actuators 36 can include, but are not limited to, pneumatic mechanisms, hydraulic mechanisms, various motors, combinations thereof, and other similar mechanisms that can be used to operate a biasing portion 54 of the electrical actuator 36 to engage opposing catch arms 80 of the latch mechanism 14.

According to the various aspects of the device, as exemplified in FIGS. 5-13, the latch mechanism 14 can include the opposing catch arms 80, a single catch 70, at least one catch 70, or other similar mechanism that can be utilized for engaging and selectively securing the latch mechanism 14 to the strike plate 18 of the cabinet 20 to define the closed position 24 of the door 10. The at least one catch 70 selectively engages the strike plate 18 in the rest position 38 to define the closed position 24 of the door 10. When the electrical actuator 36 is activated and operates within the door 10, the biasing portion 54 of the electrical actuator 36 is manipulated relative to the latch mechanism 14. The biasing portion 54 selectively engages the at least one catch 70 and moves the at least one catch 70 to define the release position 40. As the at least one catch 70 moves to the release position 40, the at least one catch 70 rotates, slides, or otherwise moves away from the strike plate 18. As described herein, in the release position 40, the door 10, being free of the at least one catch 70, is able to move in an outward direction 90 relative to the cabinet 20 to define the ajar position 28 of the door 10.

As exemplified in FIGS. 5-13, the biasing portion 54 can be in the form of a wedge or other biasing member having a biasing edge 110 that engages the at least one catch 70. The biasing edge 110 operates the at least one catch 70 from the rest position 38 to the release position 40 to disengage the at least one catch 70 from the strike plate 18. This biasing edge 110 typically includes an angled surface 112 that operates in cooperation with the at least one catch 70 to move the catch 70 between the rest position 38 and the release position 40.

According to the various aspects of the device, as exemplified in FIGS. 4-13, the latch mechanism 14 includes a housing 120 that secures the at least one catch 70. As described herein, the at least one catch 70 typically includes opposing catch arms 80 that operate, contemporaneously and in opposition, between the rest position 38 and the release position 40. The catch arms 80 include a spring mechanism 122 that biases the catch arms 80 toward the rest position 38. When the door 10 is moved to the closed position 24, the strike plate 18 engages the catch arms 80 and outwardly biases the catch arms 80 to allow the strike plate 18 to bypass the catch arms 80 to define the closed position 24. Once the catch arms 80 allow a protrusion 124 of the strike plate 18 to pass thereby, the catch arms 80, being biased by the spring mechanism 122, are returned to the rest position 38. In this manner, the protrusion 124 of the strike plate 18 is engaged within the catch arms 80 to secure the catch arms 80 and the remainder of the door assembly 10 to the strike plate 18 in the closed position 24.

Referring again to FIGS. 4-13, the housing 120 for the latch mechanism 14 includes pivots 140 that allow the opposing catch arms 80 to rotate about dedicated rotational axes 142 between the rest position 38 and the release position 40. The spring mechanism 122 extends therebetween to bias the opposing catch arms 80 in the rest position 38. The housing 120 for the latch mechanism 14 also includes a fastening interface 144 for securing the electrical actuator 36 to the housing 120 for the latch mechanism 14. Through this interface 144, operation of the electrical actuator 36 can be directed through a shaft 146, or plunger, of the electrical actuator 36 and into the biasing portion 54 of the electrical actuator 36. This biasing portion 54 is positioned relative to the housing 120 so that the biasing portion 54 engages respective blocking surfaces 148 of each catch arm 80. By engaging the blocking surfaces 148 of each catch arm 80, the biasing portion 54 of the electrical actuator 36 can move the catch arms 80 from the rest position 38 to the release position 40.

According to the various aspects of the device, as exemplified in FIGS. 1-13, the door 10 can include a handle portion 160 that can be formed by a recess 220 defined within an outer surface 162 of the door 10, typically within a front panel 164 of the door 10. The electrical actuator 36 and the latch mechanism 14 are disposed within the interior door cavity 16 of the door 10 and proximate the handle portion 160. The handle portion 160, wherein present, narrows the interior door cavity 16 and can provide less space for operating mechanisms. In this manner, the housing 120 can include an offset structure 166 that orients the catch arms 80 along a biasing axis 170 through which the biasing portion 54 operates. Accordingly, the shaft 146 of the electrical actuator 36 operates along an operational axis 168, and contemporaneously, the biasing portion 54 operates along the biasing axis 170. The biasing axis 170 is offset from the operational axis 168. Typically, the biasing axis 170 is parallel with the operational axis 168 but is laterally offset therefrom.

By positioning the biasing portion 54 in an offset configuration with respect to the operational axis 168 of the electrical actuator 36, the latch mechanism 14 can be positioned within the interior door cavity 16 and above the handle portion 160. At the same time, the electrical actuator 36 can be positioned laterally adjacent to the handle portion 160. This configuration allows for operational space within the interior door cavity 16 to accommodate the latch mechanism 14, the electrical actuator 36 and the components of the handle portion 160 for the door 10, such as a user interface 180 of the door 10.

By incorporating the handle portion 160 of the door 10 within the front panel 164, the thickness of the door 10 proximate the handle portion 160 narrows. By narrowing, a minimal amount of space is provided between the handle portion 160 defined within the front panel 164 of the door 10 and a rear panel 172 of the door 10. By incorporating the housing 120 having the offset structure 166, the operating force of the electrical actuator 36 can be transferred from an area lateral to the handle portion 160, and upward through the interior door cavity 16 of the door 10. This operating force of the electrical actuator 36 is transferred to an area where the latch mechanism 14 engages the strike plate 18 for defining the closed position 24 of the door 10. Additionally, as described herein, operation of the electrical actuator 36 can occur automatically during an operating cycle 190 of the appliance 12 to form the vent 30 in the door 10 and the cabinet 20 during a drying phase 34 of the operating cycle 190 for the appliance 12.

According to various aspects of the device, as exemplified in FIGS. 4-13, the electrical actuator 36 includes the shaft 146 that extends along the operational axis 168 of the electrical actuator 36. The biasing portion 54 includes an offset arm 200 that extends outward from the shaft 146 to place the biasing portion 54 within the offset position and within the biasing axis 170. In this manner, the shaft 146 and the biasing portion 54 can operate simultaneously while operating through different axes, in the form of the operational axis 168 and the laterally offset biasing axis 170. Using the offset arm 200, the biasing portion 54 is positioned within the interior door cavity 16 of the door 10 and above the handle portion 160. As discussed herein, the electrical actuator 36 is positioned laterally adjacent to the handle portion 160. Using the offset arm 200, the force generated by the electrical actuator 36 can be transferred through the offset arm 200 into the biasing portion 54 to be operated along the biasing axis 170 for engaging the latch mechanism 14. In this manner, the latch mechanism 14 is able to move between the rest position 38 and the release position 40 within the confined space of the interior door cavity 16.

According to the various aspects of the device, as exemplified in FIGS. 4-13, the biasing portion 54 includes opposing angled surfaces 112 that engage and operate the latch mechanism 14 into the release position 40 to separate the opposing catch arms 80 away from one another. By moving the catch arms 80 away from one another, the release position 40 is formed that allows the latch mechanism 14 to move away from the strike plate 18. In the release position 40, the latch mechanism 14 moves freely with respect to the strike plate 18. This free movement allows the door 10 to be biased into the ajar position 28 for forming the vent 30.

When the latch mechanism 14 is in the rest position 38, the door 10 is able to be moved by a user between the closed position 24, the ajar position 28, and the open position 26. The force exerted by a user for moving the door 10 away from the closed position 24 overcomes the securing force of the latch mechanism 14 with respect to the strike plate 18. The spring mechanism 122 of the latch mechanism 14 allows the opposing catch arms 80 to separate from one another as the door 10 is pulled away from the closed position 24. When the door 10 is moved manually to the ajar position 28, the spring mechanism 122 of the latch mechanism 14 biases the opposing catch arms 80 back to the rest position 38 to be selectively reengaged with the strike plate 18 at a later time. Through this configuration, a door latching mechanism and the automatic release mechanism for the door 10 are defined within a single assembly. Through this configuration, the same mechanism that secures the door 10 to the cabinet 20 can be utilized for selectively, and automatically, releasing the door 10 during the drying phase 34 of an operating cycle 190. As discussed herein, the automatic movement of the door 10 to the ajar position 28 defines the vent 30 that allows steam 32 to escape the processing space 22 during the drying phase 34.

According to the various aspects of the device, as exemplified in FIGS. 1-13, the door assembly 10 of the appliance 12 includes the front panel 164 that is configured to be rotationally operable relative to the cabinet 20 for the appliance 12. The front panel 164 is further configured to define an outer surface 162 of the appliance cabinet 20. The outer surface 162 of the front panel 164 can define the handle recess 220 of the handle portion 160 for the door assembly 10. The rear panel 172 of the door assembly 10 is configured to partially define the processing space 22 of the cabinet 20 in the closed position 24. The front panel 164 is attached to the rear panel 172 to define the interior door cavity 16 therebetween. The handle recess 220 extends into the interior door cavity 16 and toward the rear panel 172. The electrical actuator 36 is disposed within the interior door cavity 16 proximate, and, typically, laterally adjacent to, the recess 220 of the handle portion 160. The electrical actuator 36 operates between the retracted position 50 and the extended position 52. The latch mechanism 14 is in communication with the electrical actuator 36. The latch mechanism 14 operates between the rest position 38 that corresponds to the retracted position 50 of the electrical actuator 36. Additionally, the latch mechanism 14 operates to the release position 40 that corresponds to the extended position 52 of the electrical actuator 36. In the rest position 38, the latch mechanism 14 is adapted to selectively secure the front panel 164 and the rear panel 172, and the entire door assembly 10, to the strike plate 18 of the cabinet 20. In the release position 40, the latch mechanism 14 is disengaged from the strike plate 18 to define the ajar position 28 of the door assembly 10.

Referring again to FIGS. 4-13, the electrical actuator 36 includes the biasing portion 54 that selectively engages the latch mechanism 14. In this manner, the biasing portion 54 engages and biases the opposing catch arms 80 of the latch mechanism 14 to the release position 40. In this release position 40, the protrusion 124 of the strike plate 18 is able to freely pass between the opposing catch arms 80 of the latch mechanism 14. When the electrical actuator 36 is returned to the retracted position 50 and the opposing catch arms 80 return to the rest position 38, the door 10 can be secured in the closed position 24 through engagement of the strike plate 18 and the latch mechanism 14.

As described herein, it is contemplated that the door 10 can be biased toward the ajar position 28 by a compressible seal, or other similar mechanism. It is also contemplated that the door 10 can be biased toward the ajar position 28 through the force of gravity. In such an aspect of the device, a hinge 230 for the door 10 can include various detents or other rotational stops 232 that can be utilized for temporarily maintaining a rotational position of the door 10 in the ajar position 28. Such a rotational stop 232 can have a sufficient retaining force to overcome the force of gravity to hold the door 10 in the ajar position 28. It is contemplated that operation by a user to rotate the door 10 between the closed position 24 and the open position 26 will overcome the rotational stop 232 to allow the door 10 to be easily moved past the ajar position 28 and to either the open position 26 or the closed position 24.

Referring again to FIGS. 1-13, the strike plate 18 is attached to the cabinet 20, and typically to a structural member 240 of the cabinet 20. By using the strike plate 18 within the cabinet 20 and the operable components of the latch mechanism 14 and the electrical actuator 36 within the door 10, minimal amounts of space within the walls 242 of the cabinet 20 are devoted to mechanisms for securing the door 10 in a closed position 24. Accordingly, more insulation can be disposed within the cabinet 20 for preventing the escape of steam 32, heat, noise, and vapor from the processing space 22 during operation of the appliance 12. Additionally, by attaching the strike plate 18 to the cabinet 20, the processing space 22 can be made larger through the absence of operating components within the walls 242 of the cabinet 20. As described herein, the operating components for the latch mechanism 14 and the electrical actuator 36 are disposed within the door 10 itself such that more space can be devoted within the walls 242 of the cabinet 20 to the processing space 22 and/or insulation.

Referring again to FIGS. 1-13, the washing appliance 12 includes the cabinet 20 that partially defines the processing space 22 therein. The door 10 is operable relative to the cabinet 20 between the closed position 24 that includes the processing space 22, and the open position 26 that provides access to the processing space 22. The door 10 is also operable to the ajar position 28 that defines the vent 30 or the processing space 22. As described herein, this vent 30 is defined between the cabinet 20 and the door 10. The electrical actuator 36 includes a shaft 146, or plunger, that operates along the operational axis 168. The electrical actuator 36 also includes the biasing portion 54 that is attached to the shaft 146. The biasing portion 54 moves along the biasing axis 170 that is laterally offset from the operational axis 168. The latch mechanism 14 is in operational communication with the biasing portion 54 of the electrical actuator 36. When the electrical actuator 36 selectively operates the latch mechanism 14 between the rest position 38 and the release position 40, the door 10 can be moved from the closed position 24 to the ajar position 28. As described herein, the electrical actuator 36 and the latch mechanism 14 are each disposed within the interior door cavity 16 of the door 10. The strike plate 18 is fixedly attached to the cabinet 20. The latch mechanism 14 in the rest position 38 selectively engages the strike plate 18 to define the closed position 24 of the door 10. Operation of the latch mechanism 14 into the release position 40 selectively disengages the latch mechanism 14 from the strike plate 18 and allows the door 10 to move into the ajar position 28 to define the vent 30. To allow the latch mechanism 14 to receive the strike plate 18, the rear panel 172 of the door 10 can include an aperture 250. This aperture 250 provides access for the protrusion 124 of the strike plate 18 to move through the rear panel 172 to engage the latch mechanism 14 in the rest position 38. Through this engagement, the strike plate 18 and the latch mechanism 14 can define the closed position 24 of the door 10.

According to the various aspects of the device, because the biasing portion 54 of the electrical actuator 36 is offset relative to the operational axis 168 of electrical actuator 36, the electrical actuator 36 can include various guides or reinforcing features that maintain the position of the shaft 146 along the operational axis 168. Using these guides, the shaft 146 is prevented from rotating or otherwise deflecting away from the operational axis 168 due to a movement that may be caused through engagement of the biasing portion 54 with the opposing catch arms 80 of the latch mechanism 14.

According to the various aspects of the device, the strike plate 18 is fixedly attached to a structure of the cabinet 20 for securing the door 10 to the cabinet 20. As described herein, because the strike plate 18 occupies minimal amounts of space with the walls 242 of the cabinet 20, the size of the processing space 22 can be enlarged due to the absence of operating mechanisms for the door 10 within the walls 242 of the cabinet 20. Placement of the operating mechanisms for the door 10, in the form of the electrical actuator 36 and the latch mechanism 14, within the door 10, provides a common mechanism for a user to operate the door 10, as well as automatic operation of the latch mechanism 14 for releasing the door 10 from the closed position 24 during an operating cycle 190 of the appliance 10.

According to the various aspects of the device, a singular assembly for operating the door 10 for manual operation, as well as automatic operation, can be utilized for saving space within the appliance 12 for additional insulation, increased size of the processing space 22, as well as other operational efficiencies.

According to one aspect of the present disclosure, a washing appliance includes a cabinet, a door, an electrical actuator, and a strike plate. The cabinet partially defines a processing space therein. The door is operable relative to the cabinet between a closed position that encloses the processing space, an open position that provides access to the processing space, and an ajar position that defines a vent of the processing space between the cabinet and the door. The door in the closed position is biased to the ajar position. The electrical actuator selectively operates a latch mechanism between a rest position and a release position. The electrical actuator and the latch mechanism are disposed within the door. The strike plate is attached to the cabinet. The latch mechanism in the rest position selectively engages the strike plate to define the closed position. Further, operation of the latch mechanism to the release position selectively disengages the latch mechanism from the strike plate and allows the door to move into the ajar position to define the vent.

According to another aspect, the electrical actuator is a wax motor that operates the latch mechanism between the rest position and the release position.

According to another aspect, the latch mechanism includes at least one catch that selectively engages the strike plate in the rest position to define the closed position of the door, and the electrical actuator operates within the door to manipulate a biasing portion of the electrical actuator. The biasing portion selectively engages the at least one catch to define the release position.

According to another aspect, the biasing portion is a wedge having a biasing edge that engages the at least one catch. The biasing edge operates the at least one catch from the rest position to the release position to disengage the at least one catch from the strike plate.

According to another aspect, the door includes a handle portion that is formed by a recess defined within an outer surface of the door, and the electrical actuator and the latch mechanism are disposed within the door and proximate the handle portion.

According to another aspect, the biasing portion of the electrical actuator includes a shaft that extends along an operational axis of the electrical actuator, and the biasing portion further includes an offset arm that extends outward from the shaft.

According to another aspect, the biasing portion operates along a biasing axis that is parallel with the operational axis and offset from the operational axis. The biasing portion operates within an interior door cavity of the door that is above the handle portion.

According to another aspect, the shaft of the electrical actuator operates within an area that is laterally adjacent to the handle portion.

According to another aspect, the at least one catch of the latch mechanism includes opposing catch arms that selectively engage the strike plate to define the closed position of the door.

According to another aspect, the biasing edge of the biasing portion includes opposing angled surfaces that operate into the release position to separate the opposing catch arms away from one another to further define the release position that selectively disengages the latch mechanism from the strike plate.

According to another aspect, the electrical actuator operates from the rest position to the release position as part of a drying phase of an operating cycle. The vent is defined during the drying phase to allow steam to escape the processing space via the vent.

According to another aspect of the present disclosure, a door assembly of a cleaning appliance includes a front panel, a rear panel, an electrical actuator, and a latch mechanism. The front panel is configured to be rotationally operable relative to an appliance cabinet, and the front panel is further configured to define an outer surface of the appliance cabinet. The front panel defines a handle recess. The rear panel is configured to partially define a processing space of the appliance cabinet. The front panel is attached to the rear panel to define an interior door cavity therein. The handle recess extends into the interior door cavity toward the rear panel. The electrical actuator is disposed within the interior door cavity proximate the handle recess. The electrical actuator operates between a retracted position and an extended position. The latch mechanism is in communication with the electrical actuator. The latch mechanism operates between a rest position that corresponds with the retracted position of the electrical actuator and a release position that corresponds with the extended position of the electrical actuator. In the rest position, the latch mechanism is adapted to selectively secure the front panel and the rear panel to a strike plate of the appliance cabinet. In the release position, the latch mechanism is adapted to disengage from the strike plate.

According to another aspect, the electrical actuator includes a biasing portion that engages the latch mechanism and biases opposing arms of the latch mechanism to the release position.

According to another aspect, the electrical actuator includes a shaft that operates along an operational axis, and an offset arm extends from the shaft to the biasing portion. The biasing portion operates along a biasing axis that is parallel with the operational axis and offset from the operational axis.

According to another aspect, the biasing portion is positioned within the interior door cavity and above the handle recess, and the electrical actuator is positioned laterally adjacent to the handle recess.

According to another aspect, the electrical actuator operates from the rest position to the release position as part of a drying phase of an operating cycle. A vent is defined during the drying phase to allow steam to escape the processing space via the vent.

According to another aspect, the electrical actuator is a wax motor.

According to yet another aspect of the present disclosure, a washing appliance includes a cabinet, a door, an electrical actuator, a latch mechanism, and a strike plate. The cabinet partially defines a processing space therein. The door is operable relative to the cabinet between a closed position that encloses the processing space, an open position that provides access to the processing space, and an ajar position that defines a vent of the processing space between the cabinet and the door. The door in the closed position is biased to the ajar position. The electrical actuator has a shaft that operates along an operational axis and a biasing portion that is attached to the shaft. The biasing portion moves along a biasing axis that is laterally offset from the operational axis. A latch mechanism is in operational communication with the biasing portion. The electrical actuator selectively operates the latch mechanism between a rest position and a release position. The electrical actuator and the latch mechanism are disposed within an interior door cavity of the door. The strike plate is attached to the cabinet. The latch mechanism in the rest position selectively engages the strike plate to define the closed position. Further, operation of the latch mechanism to the release position selectively disengages the latch mechanism from the strike plate and allows the door to move into the ajar position to define the vent.

According to another aspect, the electrical actuator operates from the rest position to the release position as part of a drying phase of an operating cycle. The vent is defined during the drying phase to allow steam to escape the processing space via the vent.

According to another aspect, the door includes an aperture through which a protrusion of the strike plate extends to engage the latch mechanism in the rest position to define the closed position of the door.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A washing appliance comprising:

a cabinet that partially defines a processing space therein;

a door that is operable relative to the cabinet between a closed position that encloses the processing space, an open position that provides access to the processing space, and an ajar position that defines a vent of the processing space between the cabinet and the door, wherein the door in the closed position is biased to the ajar position;

an electrical actuator that selectively operates a latch mechanism between a rest position and a release position, wherein the electrical actuator and the latch mechanism are disposed within the door; and a strike plate attached to the cabinet, wherein the latch mechanism in the rest position selectively engages the strike plate to define the closed position, and wherein operation of the latch mechanism to the release position selectively disengages the latch mechanism from the strike plate and allows the door to move into the ajar position to define the vent.

2. The washing appliance of claim 1, wherein the electrical actuator is a wax motor that operates the latch mechanism between the rest position and the release position.

3. The washing appliance of claim 1, wherein the latch mechanism includes at least one catch that selectively engages the strike plate in the rest position to define the closed position of the door, and wherein the electrical actuator operates within the door to manipulate a biasing portion of the electrical actuator, the biasing portion selectively engaging the at least one catch to define the release position.

4. The washing appliance of claim 3, wherein the biasing portion is a wedge having a biasing edge that engages the at least one catch, wherein the biasing edge operates the at least one catch from the rest position to the release position to disengage the at least one catch from the strike plate.

5. The washing appliance of claim 4, wherein the at least one catch of the latch mechanism includes opposing catch arms that selectively engage the strike plate to define the closed position of the door.

6. The washing appliance of claim 5, wherein the biasing edge of the biasing portion includes opposing angled surfaces that operate into the release position to separate the opposing catch arms away from one another to further define the release position that selectively disengages the latch mechanism from the strike plate.

7. The washing appliance of claim 3, wherein the door includes a handle portion that is formed by a recess defined within an outer surface of the door, and wherein the electrical actuator and the latch mechanism are disposed within the door and proximate the handle portion.

8. The washing appliance of claim 7, wherein the biasing portion of the electrical actuator includes a shaft that extends along an operational axis of the electrical actuator, and wherein the biasing portion further includes an offset arm that extends outward from the shaft.

9. The washing appliance of claim 8, wherein the biasing portion operates along a biasing axis that is parallel with the operational axis and offset from the operational axis, wherein the biasing portion operates within an interior door cavity of the door that is above the handle portion.

10. The washing appliance of claim 8, wherein the shaft of the electrical actuator operates within an area that is laterally adjacent to the handle portion.

11. The washing appliance of claim 1, wherein the electrical actuator operates from the rest position to the release position as part of a drying phase of an operating cycle, wherein the vent is defined during the drying phase to allow steam to escape the processing space via the vent.

12. A door assembly of a cleaning appliance, the door assembly comprising:

a front panel configured to be rotationally operable relative to an appliance cabinet, the front panel further configured to define an outer surface of the appliance cabinet, wherein the front panel defines a handle recess;

a rear panel configured to partially define a processing space of the appliance cabinet, the front panel attached to the rear panel to define an interior door cavity therein, wherein the handle recess extends into the interior door cavity toward the rear panel;

an electrical actuator disposed within the interior door cavity proximate the handle recess, wherein the electrical actuator operates between a retracted position and an extended position; and a latch mechanism in communication with the electrical actuator, wherein the latch mechanism operates between a rest position that corresponds with the retracted position of the electrical actuator and a release position that corresponds with the extended position of the electrical actuator, wherein in the rest position, the latch mechanism is adapted to selectively secure the front panel and the rear panel to a strike plate of the appliance cabinet; and in the release position, the latch mechanism is adapted to disengage from the strike plate.

13. The door assembly of claim 12, wherein the electrical actuator includes a biasing portion that engages the latch mechanism and biases opposing arms of the latch mechanism to the release position.

14. The door assembly of claim 13, wherein the electrical actuator includes a shaft that operates along an operational axis, and wherein an offset arm extends from the shaft to the biasing portion, wherein the biasing portion operates along a biasing axis that is parallel with the operational axis and offset from the operational axis.

15. The door assembly of claim 13, wherein the biasing portion is positioned within the interior door cavity and above the handle recess, and wherein the electrical actuator is positioned laterally adjacent to the handle recess.

16. The door assembly of claim 12, wherein the electrical actuator operates from the rest position to the release position as part of a drying phase of an operating cycle, wherein a vent is defined during the drying phase to allow steam to escape the processing space via the vent.

17. The door assembly of claim 12, wherein the electrical actuator is a wax motor.

18. A washing appliance comprising:

a cabinet that partially defines a processing space therein;

a door that is operable relative to the cabinet between a closed position that encloses the processing space, an open position that provides access to the processing space, and an ajar position that defines a vent of the processing space between the cabinet and the door, wherein the door in the closed position is biased to the ajar position;

an electrical actuator having a shaft that operates along an operational axis and a biasing portion that is attached to the shaft, the biasing portion moving along a biasing axis that is laterally offset from the operational axis;

a latch mechanism that is in operational communication with the biasing portion, wherein the electrical actuator selectively operates the latch mechanism between a rest position and a release position, wherein the electrical actuator and the latch mechanism are disposed within an interior door cavity of the door; and a strike plate attached to the cabinet, wherein the latch mechanism in the rest position selectively engages the strike plate to define the closed position, and wherein operation of the latch mechanism to the release position selectively disengages the latch mechanism from the strike plate and allows the door to move into the ajar position to define the vent.

19. The washing appliance of claim 18, wherein the electrical actuator operates from the rest position to the release position as part of a drying phase of an operating cycle, wherein the vent is defined during the drying phase to allow steam to escape the processing space via the vent.

20. The washing appliance of claim 18, wherein the door includes an aperture through which a protrusion of the strike plate extends to engage the latch mechanism in the rest position to define the closed position of the door.

* * * * *